US008250389B2

(12) United States Patent
Archer et al.

(10) Patent No.: US 8,250,389 B2
(45) Date of Patent: Aug. 21, 2012

(54) PROFILING AN APPLICATION FOR POWER CONSUMPTION DURING EXECUTION ON A PLURALITY OF COMPUTE NODES

(75) Inventors: Charles J. Archer, Rochester, MN (US); Michael A. Blocksome, Rochester, MN (US); Amanda E. Peters, Rochester, MN (US); Joseph D. Ratterman, Rochester, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1068 days.

(21) Appl. No.: 12/167,302

(22) Filed: Jul. 3, 2008

(65) Prior Publication Data

US 2010/0005326 A1    Jan. 7, 2010

(51) Int. Cl.
*G06F 1/32* (2006.01)
(52) U.S. Cl. .................................. 713/320; 709/201
(58) Field of Classification Search .................. 713/320
See application file for complete search history.

(56) References Cited

U.S. PATENT DOCUMENTS

| | | | |
|---|---|---|---|
| 5,850,539 A | 12/1998 | Cook et al. | |
| 6,760,852 B1 | 7/2004 | Gulick | |
| 6,804,632 B2 | 10/2004 | Orenstien et al. | |
| 7,251,737 B2 | 7/2007 | Weinberger et al. | |
| 7,281,146 B2 | 10/2007 | Nalawadi et al. | |
| 7,284,137 B2 | 10/2007 | Clark et al. | |
| 7,305,569 B2 | 12/2007 | Reilly | |
| 7,330,983 B2 | 2/2008 | Chaparro et al. | |
| 7,533,282 B2 | 5/2009 | Ohneda et al. | |
| 7,549,069 B2 * | 6/2009 | Ishihara et al. | 713/320 |
| 7,716,500 B2 | 5/2010 | Eslinger | |
| 7,885,795 B2 | 2/2011 | Rasmussen et al. | |
| 2004/0073822 A1 | 4/2004 | Greco et al. | |
| 2004/0153867 A1 | 8/2004 | McAlinden et al. | |
| 2004/0168097 A1 | 8/2004 | Cook et al. | |
| 2004/0264652 A1 | 12/2004 | Erhart et al. | |
| 2005/0055590 A1 | 3/2005 | Farkas et al. | |
| 2005/0177327 A1 | 8/2005 | Banginwar et al. | |
| 2006/0253507 A1 | 11/2006 | Schank et al. | |
| 2006/0282838 A1 | 12/2006 | Gupta et al. | |
| 2007/0005998 A1 | 1/2007 | Jain et al. | |
| 2007/0033367 A1 | 2/2007 | Sakarda et al. | |
| 2007/0067657 A1 | 3/2007 | Ranganathan et al. | |
| 2007/0198864 A1 * | 8/2007 | Takase | 713/300 |
| 2007/0300083 A1 | 12/2007 | Goodrum et al. | |
| 2008/0178029 A1 | 7/2008 | McGrane et al. | |
| 2008/0228462 A1 | 9/2008 | Gross et al. | |
| 2008/0234873 A1 | 9/2008 | Gorbatov et al. | |

(Continued)

OTHER PUBLICATIONS

Office Action, U.S. Appl. No. 12/129,334, May 29, 2008.

(Continued)

*Primary Examiner* — Albert Wang
(74) *Attorney, Agent, or Firm* — Biggers & Ohanian, LLP

(57) ABSTRACT

Methods, apparatus, and products are disclosed for profiling an application for power consumption during execution on a compute node that include: receiving an application for execution on a compute node; identifying a hardware power consumption profile for the compute node, the hardware power consumption profile specifying power consumption for compute node hardware during performance of various processing operations; determining a power consumption profile for the application in dependence upon the application and the hardware power consumption profile for the compute node; and reporting the power consumption profile for the application.

15 Claims, 8 Drawing Sheets

U.S. PATENT DOCUMENTS

2008/0313482 A1   12/2008   Karlapalem et al.
2009/0024819 A1   1/2009    Fisher et al.
2009/0187658 A1   7/2009    Williams et al.
2009/0265568 A1   10/2009   Jackson

OTHER PUBLICATIONS

Office Action, U.S. Appl. No. 12/129,205, May 29, 2008.
Office Action, U.S. Appl. No. 12/127,035, Jan. 5, 2011.
Office Action, U.S. Appl. No. 12/135,593, Mar. 30, 2011.
Office Action, U.S. Appl. No. 12/129,334, Jun. 9, 2011.
Office Action, U.S. Appl. No. 12/129,205, Jun. 3, 2011.
Office Action, U.S. Appl. No. 12/135,593, Aug. 26, 2011.
Office Action, U.S. Appl. No. 12/167,302, Oct. 12, 2011.
Office Action, U.S. Appl. No. 12/135,660, Sep. 29, 2011.
Office Action, U.S. Appl. No. 12/129,319, Sep. 30, 2011.
Notice of Allowance, U.S. Appl. No. 12/127,035, Jun. 13, 2011.
Notice of Allowance, U.S. Appl. No. 13/277,350, Dec. 14, 2011.
Notice of Allowance, U.S. Appl. No. 12/129,223, Sep. 6, 2011.
Final Office Action, U.S. Appl. No. 12/129,205, Jan. 10, 2012.

* cited by examiner

PROFILING AN APPLICATION FOR POWER CONSUMPTION DURING EXECUTION ON A PLURALITY OF COMPUTE NODES

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for profiling an application for power consumption during execution on a compute node.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output ('I/O') devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute applications that include both parallel algorithms and serial algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the algorithms of an application are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource—the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In such a manner, a torus network lends itself to point to point operations. In a tree network, the nodes typically are organized in a binary tree arrangement: each node has a parent and two children (although some nodes may only have zero children or one child, depending on the hardware configuration). In computers that use a torus and a tree network, the two networks typically are implemented independently of one another, with separate routing circuits, separate physical links, and separate message buffers. A tree network provides high bandwidth and low latency for certain collective operations, such as, for example, an allgather, allreduce, broadcast, scatter, and so on.

When processing an application, the compute nodes typically do not utilize the nodes' hardware components uniformly for each portion of the application. For example, during a portion of the application that performs a collective operation, the compute nodes typically utilize the nodes' network components that interface with the tree network but do not utilize the components that interface with the torus network. During a portion of the application that performs mathematical operations on integers, the compute nodes typically do not need to utilize the float-point units of the nodes' processors. The manner in which the nodes' hardware components are utilized to process the different portions of the application determine the overall power consumption of the nodes while executing the application. Having information on how the compute nodes consume power while executing an application may help application developers efficiently reduce the power consumption of the application, thereby conserving valuable computing resources.

SUMMARY OF THE INVENTION

Methods, apparatus, and products are disclosed for profiling an application for power consumption during execution on a compute node that include: receiving an application for execution on a compute node; identifying a hardware power consumption profile for the compute node, the hardware power consumption profile specifying power consumption for compute node hardware during performance of various processing operations; determining a power consumption profile for the application in dependence upon the application and the hardware power consumption profile for the compute node; and reporting the power consumption profile for the application.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
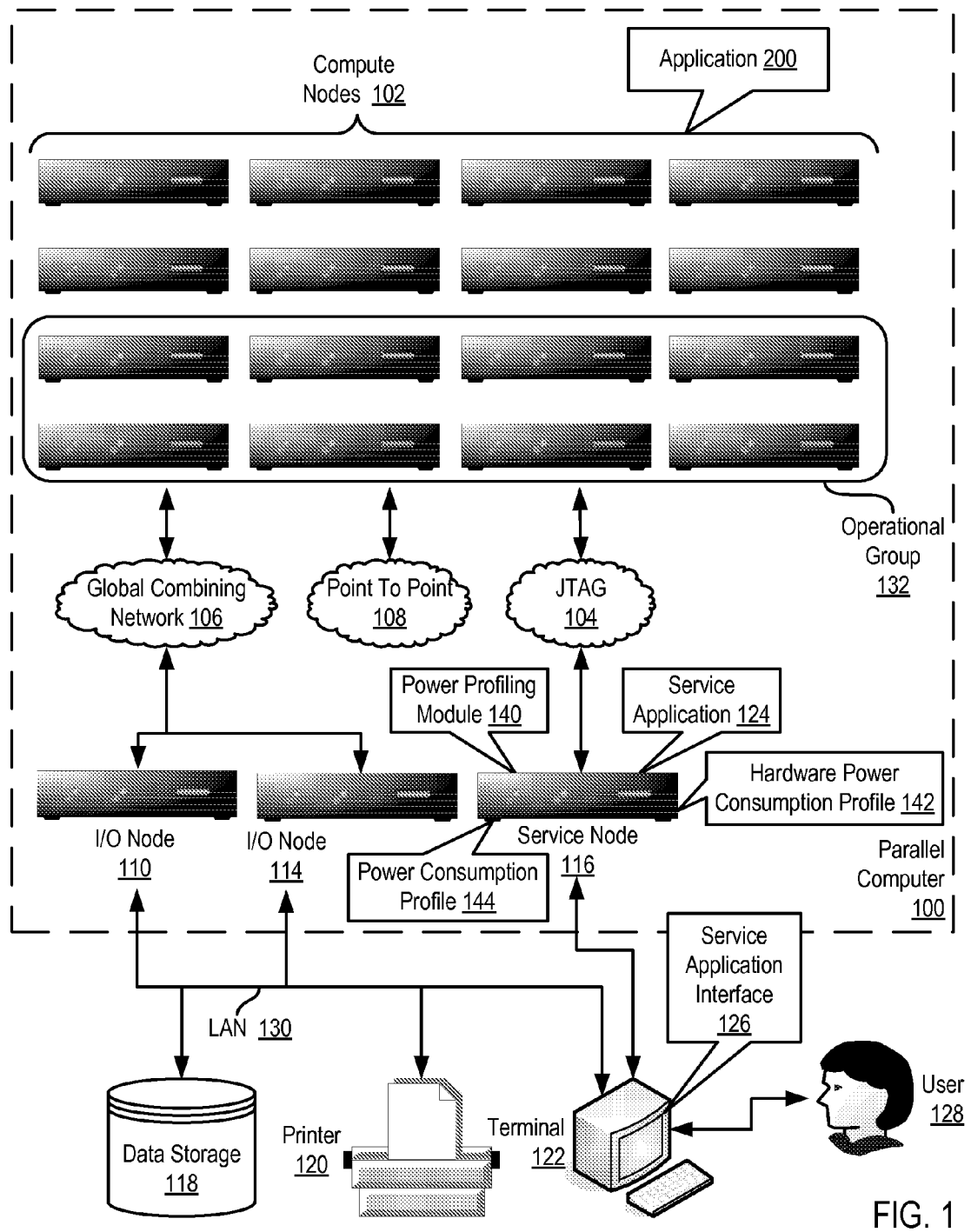
FIG. 1 illustrates an exemplary system for profiling an application for power consumption during execution on a compute node according to embodiments of the present invention.

Exemplary methods, apparatus, and computer program products for profiling an application for power consumption during execution on a compute node according to embodiments of the present invention are described with reference to the accompanying drawings, beginning with FIG. 1. FIG. 1 illustrates an exemplary system for profiling an application (200) for power consumption during execution on a compute node (100) according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102) that execute an application (200). The application (200) of FIG. 1 is a set of computer program instructions that provide user-level data processing.

Each compute node (102) of FIG. 1 may include a plurality of processors for use in executing an application on the parallel computer (100) according to embodiments of the present invention. The processors of each compute node (102) in FIG. 1 are operatively coupled to computer memory such as, for example, random access memory ('RAM'). Each compute node (102) may operate in several distinct modes that affect the relationship among the processors and the memory on that node such as, for example, serial processing mode or parallel processing mode. The mode in which the compute nodes operate is generally set during the node's boot processes and does not change until the node reboots.

In serial processing mode, often referred to a 'virtual node mode,' the processors of a compute node operate independently of one another, and each processor has access to a partition of the node's total memory that is exclusively dedicated to that processor. For example, if a compute node has four processors and two Gigabytes (GB) of RAM, when operating in serial processing mode, each processor may process a thread independently of the other processors on that node, and each processor may access a 512 Megabyte (MB) portion of that node's total 2 GB of RAM.

In parallel processing mode, often referred to as 'symmetric multi-processing mode,' one of the processors acts as a master, and the remaining processors serve as slaves to the master processor. Each processor has access to the full range of computer memory on the compute node. Continuing with the exemplary node above having four processors and 2 GB of RAM, for example, each slave processor may cooperatively process threads spawned from the master processor, and all of the processors have access to the node's entire 2 GB of RAM.

The compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. The links between compute nodes are bidirectional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

The service node (116) of FIG. 1 also has installed upon it a power profiling module (140). The power profiling module (140) of FIG. 1 is a set of computer program instructions capable of profiling an application for power consumption during execution on a compute node according to embodiments of the present invention. The power profiling module (140) of FIG. 1 operates generally for profiling an application for power consumption during execution on a compute node according to embodiments of the present invention by: receiving the application (200) for execution on a compute node; identifying a hardware power consumption profile (142) for the compute node, the hardware power consumption profile (142) specifying power consumption for compute node hardware during performance of various processing operations; determining a power consumption profile (144) for the application (200) in dependence upon the application (200) and the hardware power consumption profile (142) for the compute node; and reporting the power consumption profile (144) for the application (200).

The power consumption profile (144) of FIG. 1 for the application (200) is a data structure that associates power consumption with particular portions of the application (200). As mentioned above, different portions of an application may utilize compute node hardware in different ways, thereby resulting in different levels of power consumption based on the application portion being executed. Power consumption for compute node hardware may be specified in units of Watts, some other units of power, or in the units of some other quantity having a known relationship to power such as, for example, energy, CPU cycles, and so on. The values used to represent power consumption in the power consumption profile (144) may be actual measured values or estimated values based on measured values.

The hardware power consumption profile (142) of FIG. 1 represents a data structure that specifies power consumption for compute node hardware during performance of various processing operations. A processing operation is a task specified by an application or performed by a compute node in response to a task specified by an application. Such a task may be a single instruction or a set of multiple instructions. For example, a processing operation may be implemented as a single float multiply-add instruction or a series of instructions processed when a cache miss occurs during application execution. Compute node hardware may include, for example, a compute node's processors, computer memory, adapter circuitry, and other hardware as will occur those of skill in the art.

Readers will note that the hardware power consumption profile (142) provides power consumption information of various processing operations for platform-specific hardware. In such a manner, the service node (116) may use the hardware power consumption profile (142) to translate processing operations specified by the application (200) into power consumption information for various portions of the application (200) executing on the platform-specific hardware. Using different hardware power consumption profiles, the service node (116) may obtain different power consumption profiles for the application (200) on the different hardware platforms even though the processing operations specified by the application (200) may not change.

Using the power consumption profile (144) for the application (200), an application developer may discover that certain portions of the application (200) consume power at undesirable levels. Accordingly, profiling an application for power consumption during execution on a compute node according to embodiments of the present invention may also include: altering the application (200) in dependence upon the power consumption profile (144) for the application (200) and executing the altered application on the compute node.

In the example of FIG. 1, the plurality of compute nodes (102) are implemented in a parallel computer (100) and are connected together using a plurality of data communications networks (104, 106, 108). The point to point network (108) is optimized for point to point operations. The global combining network (106) is optimized for collective operations. Although profiling an application for power consumption during execution on a compute node according to embodiments of the present invention is described above in terms of an architecture for a parallel computer, readers will note that such an embodiment is for explanation only and not for limitation. In fact, profiling an application for power consumption during execution on a compute node according to embodiments of the present invention may be implemented using a variety of computer system architectures, including for example architectures for a stand-alone compute node, a cluster of nodes, a distributed computing system, a grid computing system, and so on.

The arrangement of nodes, networks, and I/O devices making up the exemplary system illustrated in FIG. 1 are for explanation only, not for limitation of the present invention. Data processing systems capable of profiling an application for power consumption during execution on a compute node according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of profiling an application for power consumption during execution on a compute node according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Figure 2:
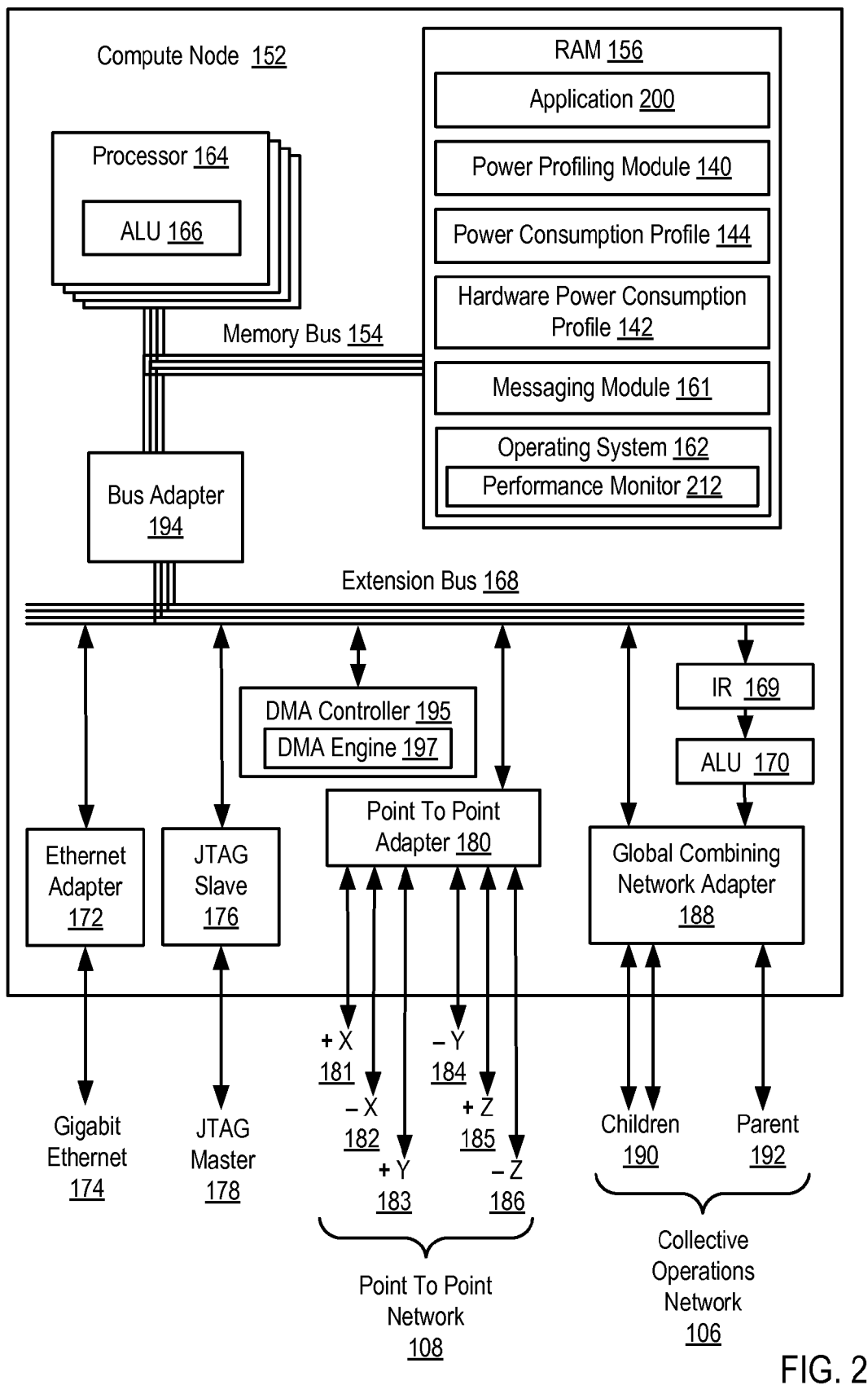
FIG. 2 sets forth a block diagram of an exemplary compute node useful in a parallel computer capable of profiling an application for power consumption during execution on a compute node according to embodiments of the present invention.

Profiling an application for power consumption during execution on a compute node according to embodiments of the present invention may be implemented on a parallel computer, among other types of exemplary systems. Such parallel computers may include thousands of such compute nodes. Each compute node is in turn itself a kind of computer composed of one or more computer processors, its own computer memory, and its own input/output adapters. For further explanation, therefore, FIG. 2 sets forth a block diagram of an exemplary compute node (152) useful in a parallel computer capable of profiling an application for power consumption during execution on a compute node according to embodiments of the present invention. The compute node (152) of FIG. 2 includes one or more computer processors (164) as well as random access memory ('RAM') (156). The processors (164) are connected to RAM (156) through a high-speed memory bus (154) and through a bus adapter (194) and an extension bus (168) to other components of the compute node (152). Stored in RAM (156) of FIG. 2 is an application (200). The application (200) is a set of computer program instructions that provide user-level data processing.

Also stored in RAM (156) is a power profiling module (140), a set of computer program instructions capable of profiling an application for power consumption during execution on a compute node according to embodiments of the present invention. The power profiling module (140) of FIG. 2 operates generally for profiling an application for power consumption during execution on a compute node according to embodiments of the present invention by: receiving the application (200) for execution on a compute node; identifying a hardware power consumption profile (142) for the compute node, the hardware power consumption profile (142) specifying power consumption for compute node hardware during performance of various processing operations; determining a power consumption profile (144) for the application (200) in dependence upon the application (200) and the hardware power consumption profile (142) for the compute node; and reporting the power consumption profile (144) for the application (200).

Also stored RAM (156) is a messaging module (161), a library of computer program instructions that carry out parallel communications among compute nodes, including point to point operations as well as collective operations. User-level applications such as application (200) effect data communications with other applications running on other compute nodes by calling software routines in the messaging modules (161). A library of parallel communications routines may be developed from scratch for use in systems according to embodiments of the present invention, using a traditional programming language such as the C programming language, and using traditional programming methods to write parallel communications routines. Alternatively, existing prior art libraries may be used such as, for example, the 'Message Passing Interface' ('MPI') library, the 'Parallel Virtual Machine' ('PVM') library, and the Aggregate Remote Memory Copy Interface ('ARMCI') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft Vista™, AIX™, IBM's i5/OS™, and others as will occur to those of skill in the art.

The operating system (162) of FIG. 2 includes a performance monitor (212). The performance monitor (212) is a service of the operating system (162) that monitors the performance characteristics of the compute node (152) and provides those performance characteristics to the power profiling module (140). The performance monitor (212) monitors the performance characteristics of the compute node (152) by receiving information from the components of the compute node (152) and from various sensors and detectors (not shown) that measure certain performance aspects of those components' operation. For example, the performance monitor (212) may maintain a counter that tracks the number of floating point operations performed by the processors (164). The performance monitor (212) may also retrieve voltage and current measures from a voltage regulator that provides power processors (164) or the memory modules implementing the RAM (156). The performance monitor (212) may communicate with the components of the compute node (152) through the processor (164) or a service processor (not shown) that connects to each of the hardware components. Such connections may be implemented using the buses (154, 168) illustrated in FIG. 2 or through out of band buses (not shown) such as, for example, an Inter-Integrated Circuit ('I2C') bus, a JTAG network, a System Management Bus ('SMBus'), and so on. The performance monitor (212) may provide an application programming interface ('API') through which other operating system software modules or software components not part of the operating system (162) may access or subscribe to the performance monitoring services provided by the performance monitor (212).

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems for profiling an application for power consumption during execution on a compute node according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in profiling an application for power consumption during execution on a compute node according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of processor (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (195), which is computer software for direct memory access. Direct memory access includes reading and writing to memory of compute nodes with reduced operational burden on the central processing units (164). A DMA transfer essentially copies a block of memory from one compute node to another. While the CPU may initiates the DMA transfer, the CPU does not execute it. In the example of FIG. 2, the DMA engine (195) and the DMA controller (195) support the messaging module (161).

Although the explanation above with reference to FIG. 2 describes a compute node, readers will note that a service node may be similarly configured and operate in the same manner as the compute node (152) for scheduling applications for execution on a plurality of compute nodes of a parallel computer to manage temperature of the plurality of compute nodes during execution according to embodiments of the present invention. That is, a service node may include one or more processors, computer memory, bus adapters and buses, communications adapters, and so on, each operatively coupled together to providing processing for computer program instructions stored in computer memory.

Figure 3A:
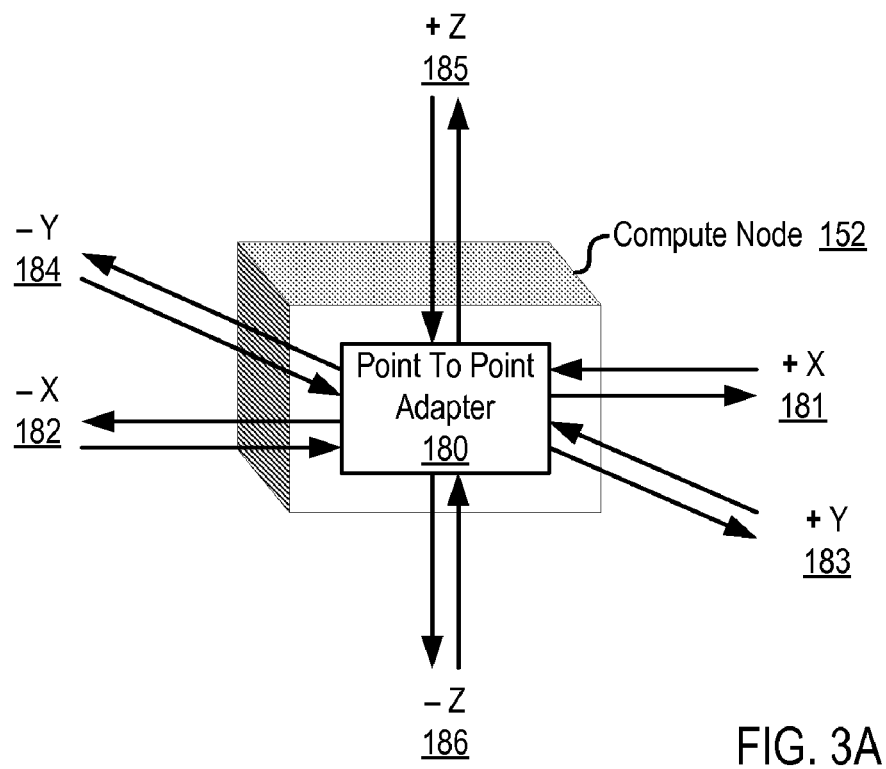
FIG. 3A illustrates an exemplary Point To Point Adapter useful in systems capable of profiling an application for power consumption during execution on a compute node according to embodiments of the present invention.

For further explanation, FIG. 3A illustrates an exemplary Point To Point Adapter (180) useful in systems capable of profiling an application for power consumption during execution on a compute node according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
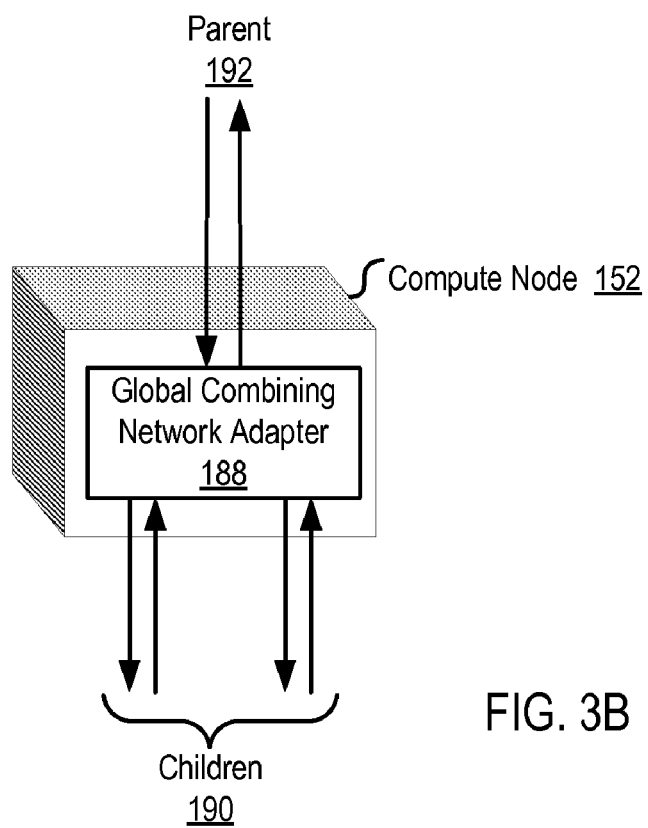
FIG. 3B illustrates an exemplary Global Combining Network Adapter useful in systems capable of profiling an application for power consumption during execution on a compute node according to embodiments of the present invention.

For further explanation, FIG. 3B illustrates an exemplary Global Combining Network Adapter (188) useful in systems capable of profiling an application for power consumption during execution on a compute node according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
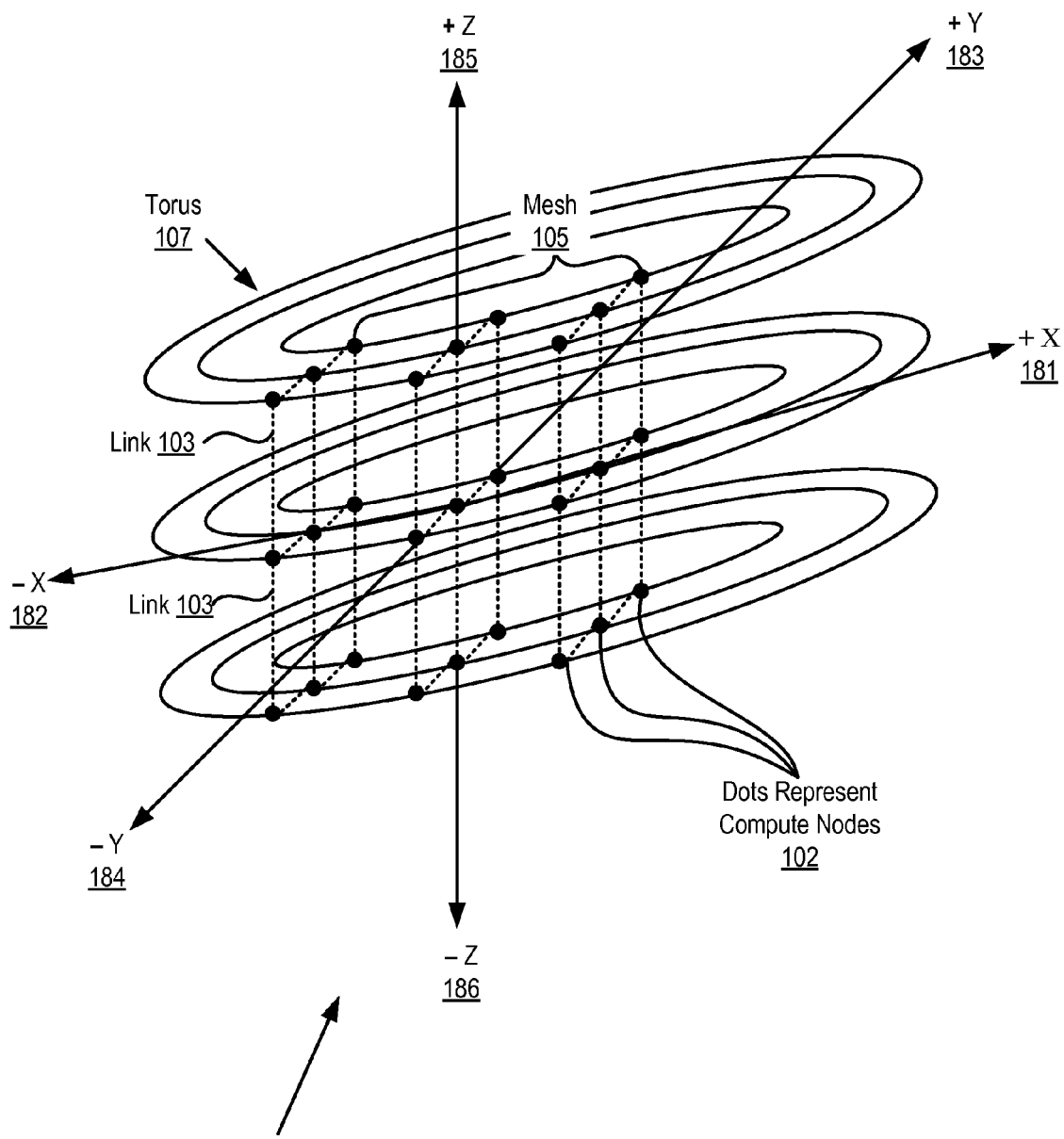
FIG. 4 sets forth a line drawing illustrating an exemplary data communications network optimized for point to point operations useful in systems capable of profiling an application for power consumption during execution on a compute node in accordance with embodiments of the present invention.

For further explanation, FIG. 4 sets forth a line drawing illustrating an exemplary data communications network (108) optimized for point to point operations useful in systems capable of profiling an application for power consumption during execution on a compute node in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in profiling an application for power consumption during execution on a compute node in accordance with embodiments of the present invention may contain only a few compute nodes or may contain thousands of compute nodes.

Figure 5:
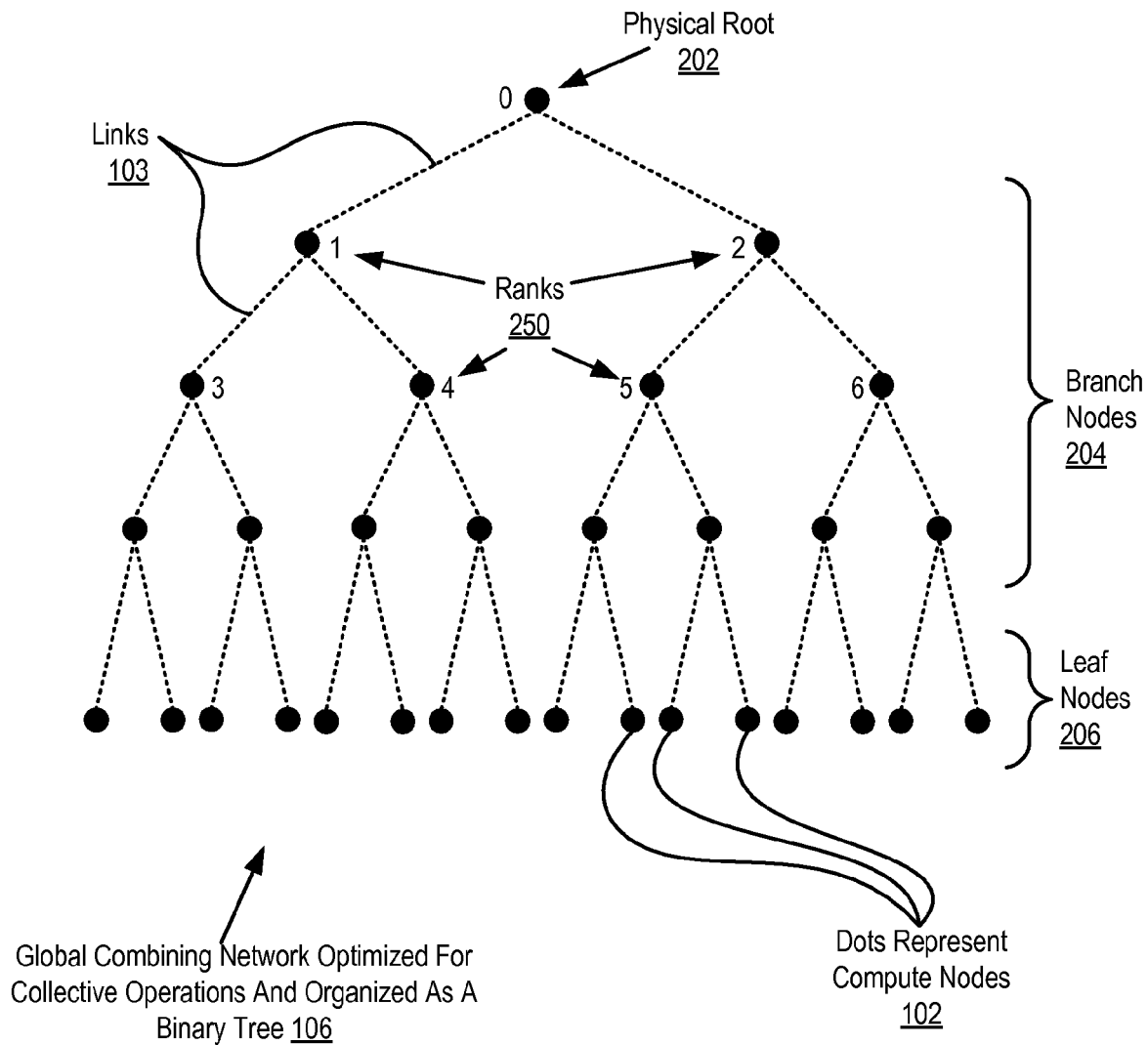
FIG. 5 sets forth a line drawing illustrating an exemplary data communications network optimized for collective operations useful in systems capable of profiling an application for power consumption during execution on a compute node in accordance with embodiments of the present invention.

For further explanation, FIG. 5 sets forth a line drawing illustrating an exemplary data communications network (106) optimized for collective operations useful in systems capable of profiling an application for power consumption during execution on a compute node in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for profiling an application for power consumption during execution on a compute node in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
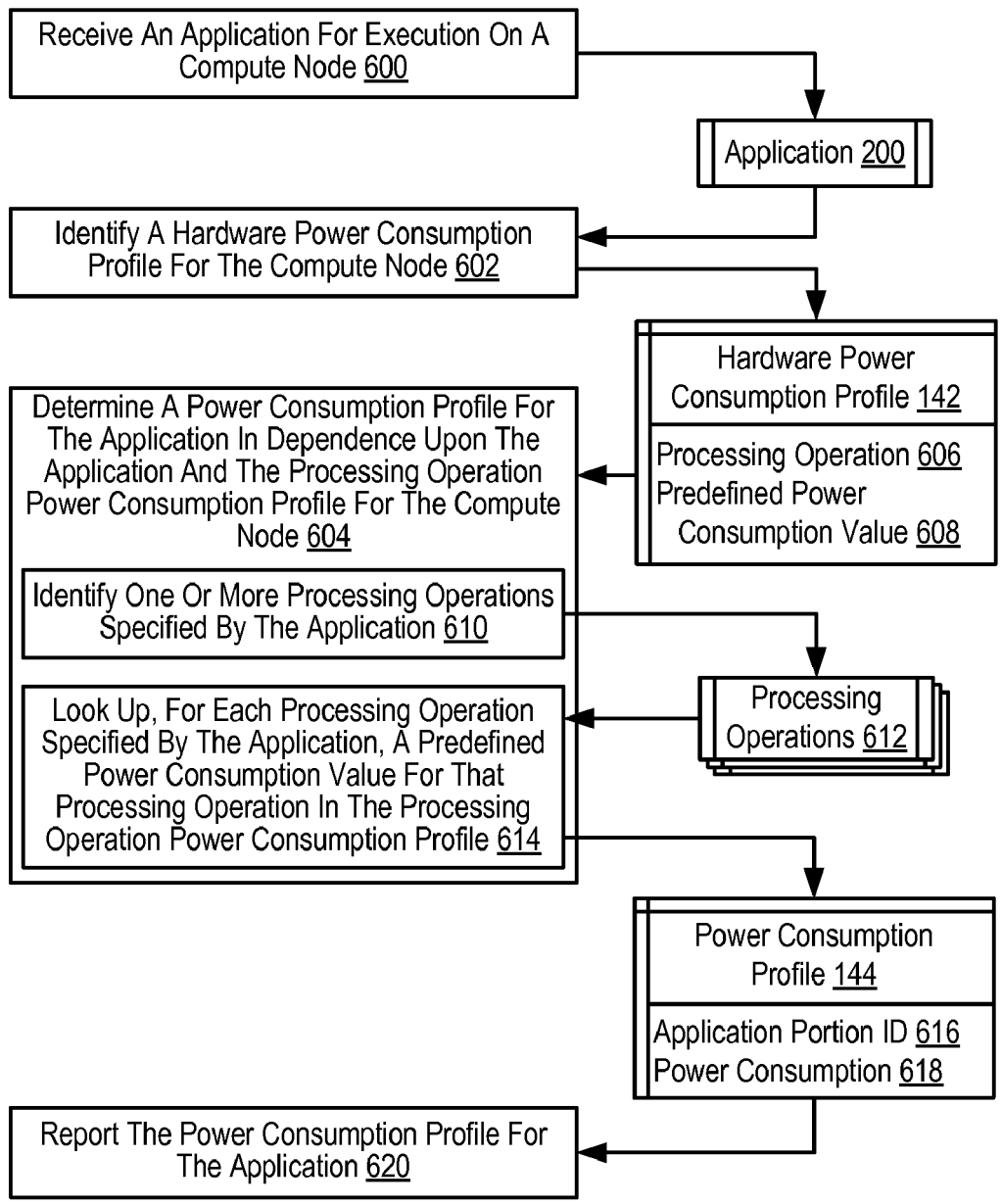
FIG. 6 sets forth a flow chart illustrating an exemplary method for profiling an application for power consumption during execution on a compute node according to embodiments of the present invention.

For further explanation, FIG. 6 sets forth a flow chart illustrating an exemplary method for profiling an application for power consumption during execution on a compute node according to embodiments of the present invention. Profiling an application for power consumption during execution on a compute node according to the method of FIG. 6 may be carried out by a power profiling module installed on a stand-along computer or a service node of a parallel computer such as, for example, the service described above. Such a parallel computer may include a plurality of compute nodes in a parallel computer connected together for data communications using a plurality of data communications networks. At least one of the data communications networks may be optimized for point to point operations, and at least one of the data communications may be optimized for collective operations. The method of FIG. 6 includes receiving (600) an application (200) for execution on a compute node. A service node may receive (600) an application (200) for execution on a compute node according to the method of FIG. 6 by receiving an identifier for the application (200) from a system administrator or a job file and retrieving the application (200) matching the application identifier from data storage. The data storage may be directly connected to the service node through a storage drive adapter, indirectly connected through a network, or through any other means as will occur to those of skill in the art.

The method of FIG. 6 includes identifying (602) a hardware power consumption profile (142) for the compute node. The hardware power consumption profile (142) of FIG. 6 represents a data structure that specifies power consumption for compute node hardware during performance of various processing operations (606). In such a manner, the hardware power consumption profile (142) provides power consumption information of various processing operations for platform-specific hardware. The hardware power consumption profile (142) may be used to translate processing operations specified by the application (200) into power consumption information for those processing operations when performed by the platform-specific hardware. Using different hardware power consumption profiles for different compute nodes, therefore, allows a service node to determine the different power consumptions that would occur by executing the application (200) on different compute nodes.

In the example of FIG. 6, each record of the hardware power consumption profile (142) specifies a processing operation (606) and a predefined power consumption value (608). As mentioned above, a processing operation (606) in the example of FIG. 6 is a task specified by an application or performed by a compute node in response to a task specified by an application. Such a task may be a single instruction or a set of multiple instructions. For example, a processing operation may be implemented as a single float multiply-add instruction or a series of instructions processed when a cache miss occurs during application execution. In the example of FIG. 6, a predefined power consumption value (608) is a value represents the power consumption by a compute node when the associated processing operation is performed by the compute node. The predefined power consumption value (608) of FIG. 6 may be specified in units of Watts, some other units of power, or in the units of some other quantity having a known relationship to power such as, for example, energy, CPU cycles, and so on. The power consumption value (608) of FIG. 6 is 'predefined' in the sense that previous measurements or estimation is used to determine the power consumption of performing a particular processing operation on a particular compute node. For further explanation of the hardware power consumption profile (142), consider the following exemplary hardware power consumption profile:

TABLE 1

EXEMPLARY HARDWARE POWER CONSUMPTION PROFILE

| PROCESSING OPERATION | PREDEFINED POWER CONSUMPTION VALUE |
|---|---|
| integer-add | 80 Watts |
| branch | 120 Watts |
| float-multiply-add | 150 Watts |
| . . . | . . . |

Table 1 above illustrates an exemplary hardware power consumption profile for a particular compute node. The exemplary hardware power consumption profile above specifies that the compute node consumes 80 Watts of power while performing an addition operation on integers. In addition, the exemplary hardware power consumption profile above specifies that the compute node consumes 120 Watts of power while performing a branch operation. The exemplary hardware power consumption profile above also specifies that the compute node consumes 150 Watts of power while performing a multiply-add operation on floating point values. Readers will note that the exemplary hardware power consumption profile illustrated above is for explanation only and not for limitation, but other hardware power consumption profiles may also be useful in exemplary embodiments of the present invention.

The method of FIG. 6 also includes determining (604) a power consumption profile (144) for the application (200) in dependence upon the application (200) and the hardware power consumption profile (142) for the compute node. Because different portions of an application may utilize compute node hardware in different ways, different levels of power consumption typically occur during different portions of the application's execution sequence. The power consumption profile (144) of FIG. 6 for the application (200) represents a data structure that associates power consumption with particular portions of the application (200). In the example of FIG. 6, each record of the power consumption profile (144) specifies a particular portion of the application (200) using an application portion identifier (616) and specifies a power consumption (618) associated with that application portion. The application portion may be implemented as a single processing operation of the application or a group of processing operations such as, for example, a function or an application procedure. As mentioned above, the power consumption (618) of FIG. 6 represents the level of power consumed during execution of the portion of the application (200) associated with the power consumption in the power consumption profile record.

For further explanation, consider the following exemplary power consumption profile for an exemplary application:

TABLE 2

EXEMPLARY POWER CONSUMPTION PROFILE

| APPLICATION PORTION ID | POWER CONSUMPTION |
| --- | --- |
| AAA00000h:AAA01FFFh | 90 Watts |
| AAA02000h:AAA03AFFh | 280 Watts |
| AAA03B00h:AAA04FFFh | 150 Watts |
| ... | ... |

Table 2 above illustrates an exemplary power consumption profile for an application to be executed on a compute node. The exemplary power consumption profile above specifies that the portion of the application at memory address range 'AAA00000h:AAA01FFFh' consumes on average 90 Watts of power. The exemplary power consumption profile above specifies that the portion of the application at memory address range 'AAA02000h:AAA03AFFh' consumes on average 280 Watts of power. The exemplary power consumption profile above specifies that the portion of the application at memory address range 'AAA03B00h:AAA04FFFh' consumes on average 150 Watts of power. The exemplary power consumption profile above uses address ranges to specify portion of an application, but readers will note that line numbers in application source code files may also be used along with any other implementation as will occur to those of skill in the art. Readers will also note generally that the exemplary power consumption profile illustrated above is for explanation only and not for limitation and that other power consumption profiles may also be useful in exemplary embodiments of the present invention.

In the method of FIG. 6, determining (604) a power consumption profile (144) for the application (200) includes identifying (610) one or more processing operations (612) specified by the application (200) and looking up (614), for each processing operation (612) specified by the application (200), a predefined power consumption value (608) for that processing operation (606) in the hardware power consumption profile (142). In the example of FIG. 6, identifying (610) one or more processing operations (612) specified by the application (200) and looking up (614), for each processing operation (612) specified by the application (200), a predefined power consumption value (608) for that processing operation (606) may be carried out on a portion-by-portion basis for the application. In such a manner, determining (604) a power consumption profile (144) for the application (200) according to the method of FIG. 6 may also include averaging the power consumption for all of the processing operations in a particular application portion and associating the average power consumption with that application portion in the power consumption profile (144).

The method of FIG. 6 includes reporting (620) the power consumption profile (144) for the application (200). Reporting (620) the power consumption profile (144) for the application (200) according to the method of FIG. 6 may be carried out by rendering the power consumption profile (144) on a user interface to a system administrator, transmitting the power consumption profile (144) to a system administrator in a message, or storing the power consumption profile (144) in data storage and notifying a system administrator of the profile's data storage location. In some other embodiments, reporting (620) the power consumption profile (144) for the application (200) according to the method of FIG. 6 may also be carried out by annotating the source code version of the application (200) with the power consumption for each portion of the application (144). Annotating the source code version of the application (200) may be carried out by translating instruction addresses of the executable image of the application (200) into source code line numbers using compilation information generated by the compiler used to create the application's executable image from the source code.

The explanation above with reference to FIG. 6 describes profiling an application for power consumption without having to actually execute the application. The application need not be executed because the hardware power consumption profile may describe the power consumption on a particular hardware platform for the processing operations included in the application. In some other embodiments, however, an application power consumption profile may be generated based on the processing operations actually performed by a compute node during execution of the application—including those operations not specifically specified by the application but that occur during application execution such as, for example, operating system error handlers, cache miss operations, and so on. For further explanation, therefore, FIG. 7 sets forth a flow chart illustrating a further exemplary method for profiling an application for power consumption during execution on a compute node according to embodiments of the present invention.

Figure 7:
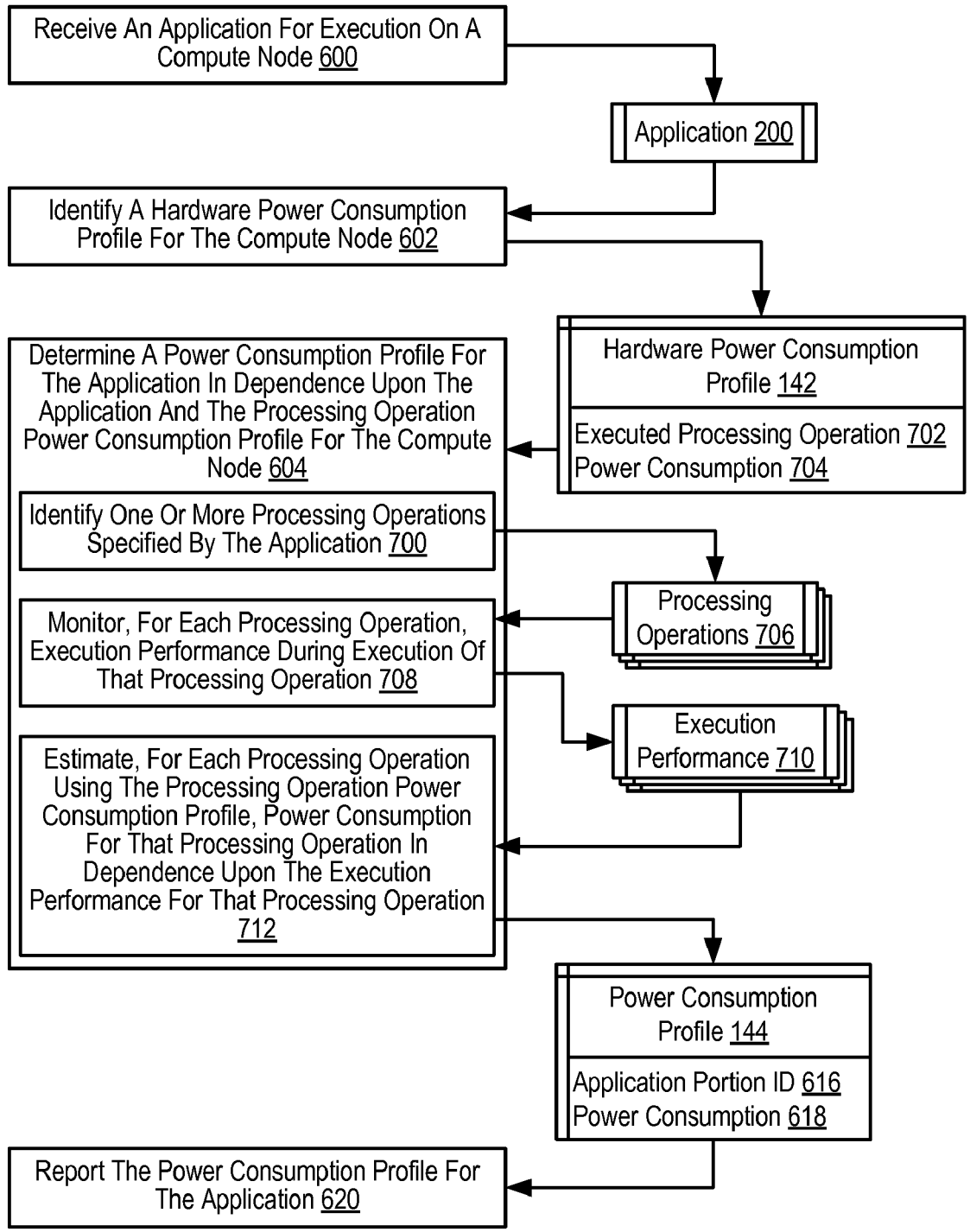
FIG. 7 sets forth a flow chart illustrating a further exemplary method for profiling an application for power consumption during execution on a compute node according to embodiments of the present invention.

The method of FIG. 7 is similar to the method of FIG. 6. That is, the method of FIG. 7 includes: receiving (600) an application (200) for execution on a compute node; identifying (602) a hardware power consumption profile (142) for the compute node, the hardware power consumption profile (142) specifying power consumption for compute node hardware during performance of various processing operations (702); determining (604) a power consumption profile (144) for the application (200) in dependence upon the application (200) and the hardware power consumption profile (142) for the compute node; and reporting (620) the power consumption profile (144) for the application (200). In the example of FIG. 7, each record of the hardware power consumption profile (142) specifies an executed processing operation (702) and a power consumption (704) that occurs when the associated processing operation (702) is executed. Each record of the power consumption profile (144) of FIG. 7 specifies a particular portion of the application (200) using an application portion identifier (616) and specifies power consumption (618) associated with that application portion.

In the method of FIG. 7, however, determining (604) a power consumption profile (144) for the application (200) includes: identifying (700) one or more processing operations (706) specified by the application (200) and monitoring (708), for each processing operation (706), execution performance (710) during execution of that processing operation (706). The execution performance (710) of FIG. 7 describes the processing operations actually executed on the compute node when the compute node executes a processing operation (706) specified by the application (200). Readers will note that the processing operations (706) specified by the application (200) are not the only processing operations that occur during execution of the application. For example, during execution of a processing operation specified by the application to load data from memory, the operating system may attempt to retrieve the data from cache and encounter a cache miss. In such an example, additional operating system processing operations for handling a cache miss are executed that would otherwise have not occurred had the data been stored in the cache. Determining (604) a power consumption profile (144) for the application (200) according to the method of FIG. 7 also includes estimating (712), for each processing operation (706) using the hardware power consumption profile (142), power consumption for that processing operation in dependence upon the execution performance (710) for that processing operation (706). Estimating (712) power consumption for that processing operation according to the method of FIG. 7 may be carried out by locating values for power consumption (704) associated in the hardware power consumption profile (142) with the executed processing operations (702) identified when monitoring the execution performance (710) of the application (200). Similar to the method of FIG. 6, determining (604) power consumption profile (144) for the application (200) according to the method of FIG. 7 may be carried out on a portion-by-portion basis for the application (200). In such a manner, determining (604) a power consumption profile (144) for the application (200) according to the method of FIG. 7 may also include averaging the power consumption for all of the processing operations in a particular application portion and associating the average power consumption with that application portion in the power consumption profile (144).

Using a power consumption profile for an application, an application developer may discover that certain portions of the application consume power at undesirable levels. In such cases, the application developer may customize the application for a specific hardware platform in an effort to reduce overall application power consumption or peak power consumption levels for the application. For further explanation, therefore, FIG. 8 sets forth a flow chart illustrating a further exemplary method for profiling an application for power consumption during execution on a compute node according to embodiments of the present invention.

Figure 8:
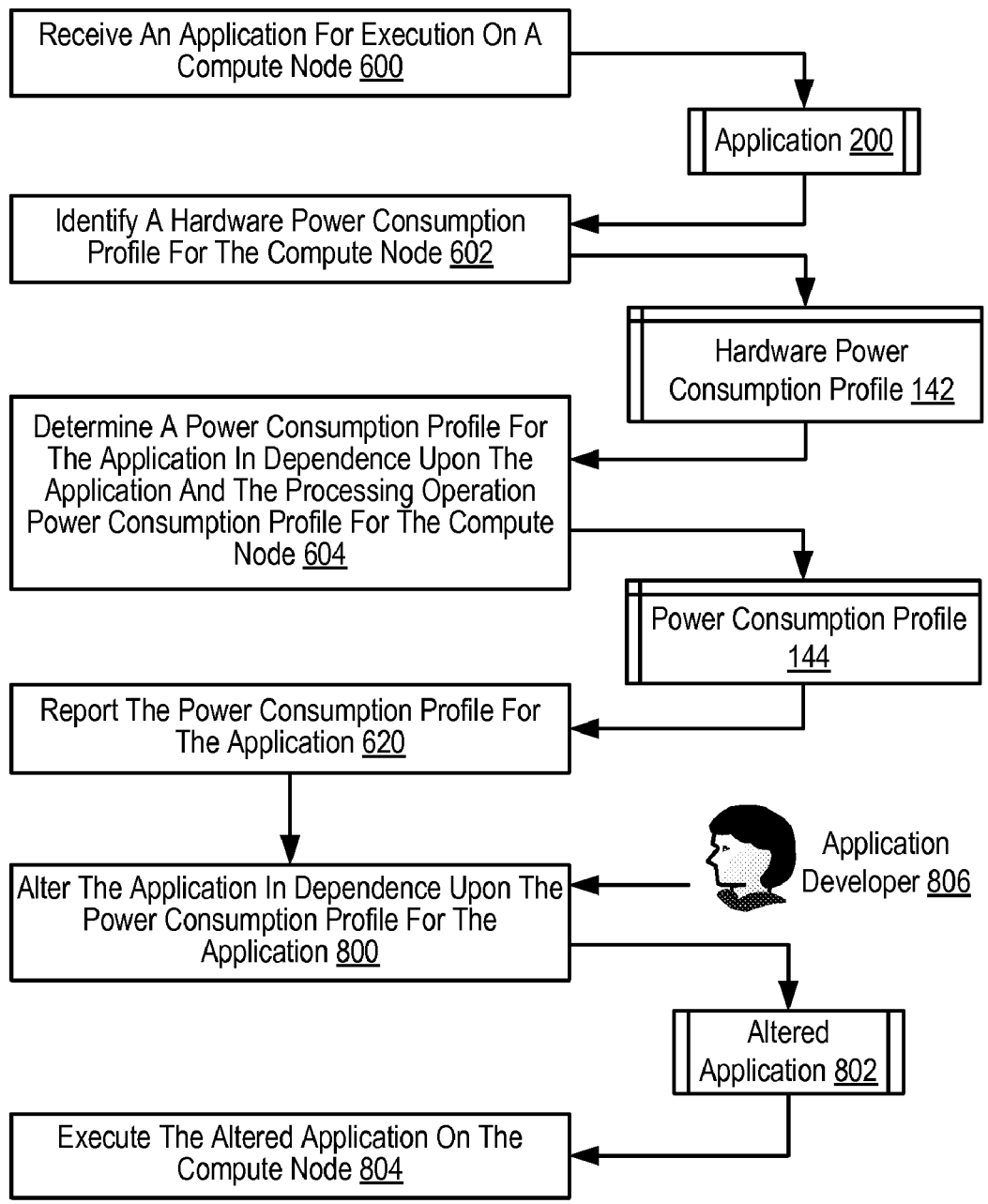
FIG. 8 sets forth a flow chart illustrating a further exemplary method for profiling an application for power consumption during execution on a compute node according to embodiments of the present invention.

The method of FIG. 8 is similar to the method of FIG. 6. That is, the method of FIG. 8 includes: receiving (600) an application (200) for execution on a compute node; identifying (602) a hardware power consumption profile (142) for the compute node, the hardware power consumption profile (142) specifying power consumption for compute node hardware during performance of various processing operations; determining (604) a power consumption profile (144) for the application (200) in dependence upon the application (200) and the hardware power consumption profile (142) for the compute node; and reporting (620) the power consumption profile (144) for the application (200).

The method of FIG. 8 also includes altering (800) the application (200) in dependence upon the power consumption profile (144) for the application (200). Altering (800) the application (200) according to the method of FIG. 8 may be carried out by an application developer (806). An application developer (806) may alter (800) the application (200) according to the method of FIG. 8 by comparing the power consumption in the power consumption profile (144) for various portions of the application (200) with a power consumption threshold and modifying the portions of the application for which the power consumption exceeds the power consumption threshold to reduce power consumption during execution of those portions of the application (200). Such a power consumption threshold may be the same value for each portion of the application or be different for different portions of the application. Additionally, the power consumption threshold may be a static threshold or one that changes dynamically based on the environment such as, for example, the power consumption of the other applications running on the compute node or the price of electricity. Readers will note that in addition to being carried out by an application developer, computer software may also be used to alter (800) the application (200) in dependence upon the power consumption profile (144) for the application (200). Using templates and various rulesets, the software could replace certain application portions that consume too much power with lower power consuming sets of processing operations.

The method of FIG. 8 also includes executing (804) the altered application (802) on the compute node. Executing (804) the altered application (802) on the compute node according to the method of FIG. 8 may be carried out by transferring the application (200) to the compute node and instructing the operating system on the compute node to schedule the application (200) for execution on the processors of the compute node.

Exemplary embodiments of the present invention are described largely in the context of a fully functional computer system for profiling an application for power consumption during execution on a compute node. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of profiling an application for power consumption during execution on a plurality of compute nodes, the plurality compute nodes connected together using a plurality of data communications networks, at least one data communications network optimized for collective operations, at least one data communications network optimized for point to point operations, the method comprising:

receiving an application for execution on a compute node;

identifying a hardware power consumption profile for the compute node, the hardware power consumption profile specifying power consumption for compute node hardware during performance of various processing operations;

determining a power consumption profile for the application in dependence upon the application and the hardware power consumption profile for the compute node; and reporting the power consumption profile for the application.

2. The method of claim 1 further comprising altering the application in dependence upon the power consumption profile for the application.

3. The method of claim 2 further comprising executing the altered application on the compute node.

4. The method of claim 1 wherein determining a power consumption profile for the application in dependence upon the application and the hardware power consumption profile for the compute node further comprises:

identifying one or more processing operations specified by the application; and looking up, for each processing operation specified by the application, a predefined power consumption value for that processing operation in the hardware power consumption profile.

5. The method of claim 1 wherein determining a power consumption profile for the application in dependence upon the application and the hardware power consumption profile for the compute node further comprises:

identifying one or more processing operations specified by the application;

monitoring, for each processing operation, execution performance during execution of that processing operation; and estimating, for each processing operation using the hardware power consumption profile, power consumption for that processing operation in dependence upon the execution performance for that processing operation.

6. An apparatus capable of profiling an application for power consumption during execution on a plurality of compute nodes, the plurality compute nodes connected together using a plurality of data communications networks, at least one data communications network optimized for collective operations, at least one data communications network optimized for point to point operations, the apparatus one or more computer processors and computer memory operatively coupled to the computer processors, the computer memory having disposed within it computer program instructions that, when executed by the computer processor cause the apparatus to carry out the steps of:

receiving an application for execution on a compute node;

identifying a hardware power consumption profile for the compute node, the hardware power consumption profile specifying power consumption for compute node hardware during performance of various processing operations;

determining a power consumption profile for the application in dependence upon the application and the hardware power consumption profile for the compute node; and reporting the power consumption profile for the application.

7. The apparatus of claim 6 wherein the computer memory has disposed within it computer program instructions that, when executed by the computer processor, causes the apparatus to carry out the step of altering the application in dependence upon the power consumption profile for the application.

8. The apparatus of claim 7 wherein the computer memory has disposed within it computer program instructions that, when executed by the computer processor, causes the apparatus to carry out the step of executing the altered application on the compute node.

9. The apparatus of claim 6 wherein determining a power consumption profile for the application in dependence upon the application and the hardware power consumption profile for the compute node further comprises:

identifying one or more processing operations specified by the application; and looking up, for each processing operation specified by the application, a predefined power consumption value for that processing operation in the hardware power consumption profile.

10. The apparatus of claim 6 wherein determining a power consumption profile for the application in dependence upon the application and the hardware power consumption profile for the compute node further comprises:

identifying one or more processing operations specified by the application;

monitoring, for each processing operation, execution performance during execution of that processing operation; and estimating, for each processing operation using the hardware power consumption profile, power consumption for that processing operation in dependence upon the execution performance for that processing operation.

11. A computer program product for profiling an application for power consumption during execution on a plurality of compute nodes, the plurality compute nodes connected together using a plurality of data communications networks, at least one data communications network optimized for collective operations, at least one data communications network optimized for point to point operations, the computer program product disposed upon a computer readable non-transmission medium, the computer program product comprising computer program instructions that, when executed by a computer, carry out the steps of:

receiving an application for execution on a compute node;

identifying a hardware power consumption profile for the compute node, the hardware power consumption profile specifying power consumption for compute node hardware during performance of various processing operations;

determining a power consumption profile for the application in dependence upon the application and the hardware power consumption profile for the compute node; and reporting the power consumption profile for the application.

12. The computer program product of claim 11 further comprising computer program instructions that, when executed by the computer, carry out the step of altering the application in dependence upon the power consumption profile for the application.

13. The computer program product of claim 12 further comprising computer program instructions that, when executed by the computer, carry out the step of executing the altered application on the compute node.

14. The computer program product of claim 11 wherein determining a power consumption profile for the application in dependence upon the application and the hardware power consumption profile for the compute node further comprises:
    identifying one or more processing operations specified by the application; and
    looking up, for each processing operation specified by the application, a predefined power consumption value for that processing operation in the hardware power consumption profile.

15. The computer program product of claim 11 wherein determining a power consumption profile for the application in dependence upon the application and the hardware power consumption profile for the compute node further comprises:
    identifying one or more processing operations specified by the application;
    monitoring, for each processing operation, execution performance during execution of that processing operation; and
    estimating, for each processing operation using the hardware power consumption profile, power consumption for that processing operation in dependence upon the execution performance for that processing operation.

* * * * *